United States Patent
O'Leary

(10) Patent No.: US 11,268,477 B2
(45) Date of Patent: Mar. 8, 2022

(54) FLEXIBLE SEAL FOR GAS TURBINE ENGINE

(71) Applicant: Rolls-Royce North American Technologies Inc., Indianapolis, IN (US)

(72) Inventor: Mark O'Leary, Zionsville, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 157 days.

(21) Appl. No.: 16/600,942

(22) Filed: Oct. 14, 2019

(65) Prior Publication Data

US 2021/0108596 A1 Apr. 15, 2021

(51) Int. Cl.
*F02K 1/80* (2006.01)
*F01D 25/30* (2006.01)

(52) U.S. Cl.
CPC .............. *F02K 1/805* (2013.01); *F01D 25/30* (2013.01); *F05D 2240/55* (2013.01); *F05D 2260/30* (2013.01)

(58) Field of Classification Search
CPC ................... F01D 25/30; F01D 25/243; F01D 25/24–285; F02K 1/805; F05D 2240/50–59; F05D 2230/642; F23R 2900/00017–00019
See application file for complete search history.

(56) References Cited

U.S. PATENT DOCUMENTS

| 2,712,456 A * | 7/1955 | McCreery | F01N 13/1811 285/145.5 |
|---|---|---|---|
| 3,492,030 A | 1/1970 | Harrison et al. | |
| 5,407,237 A | 4/1995 | Smoloitz | |
| 6,032,463 A | 3/2000 | Bock | |
| 8,016,325 B2 | 9/2011 | Gosis et al. | |
| 9,228,533 B2 | 1/2016 | Roberts et al. | |
| 2010/0007138 A1* | 1/2010 | Weiss | F16L 27/11 285/226 |
| 2012/0104747 A1* | 5/2012 | Ruberte Sanchez | F16L 27/11 285/299 |
| 2018/0038530 A1 | 2/2018 | Yeandel | |

* cited by examiner

Primary Examiner — Stephanie Sebasco Cheng
(74) Attorney, Agent, or Firm — Barnes & Thornburg LLP

(57) ABSTRACT

A coupling adapted for use with a gas turbine engine includes a first flange, a second flange, and a seal assembly. The first flange is coupled with an exhaust end of the gas turbine engine. The second flange is coupled with ducting downstream of the gas turbine engine. The seal assembly extends between the first flange and the second flange and is configured to block the gases from passing radially between the first flange and the second flange.

20 Claims, 4 Drawing Sheets

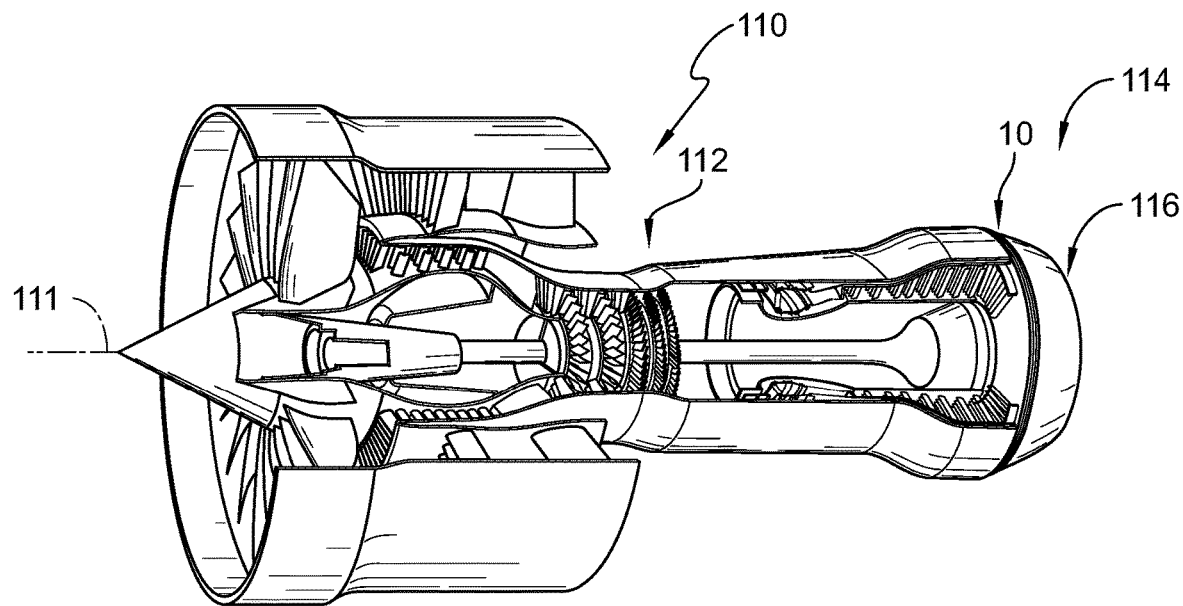
FIG. 1
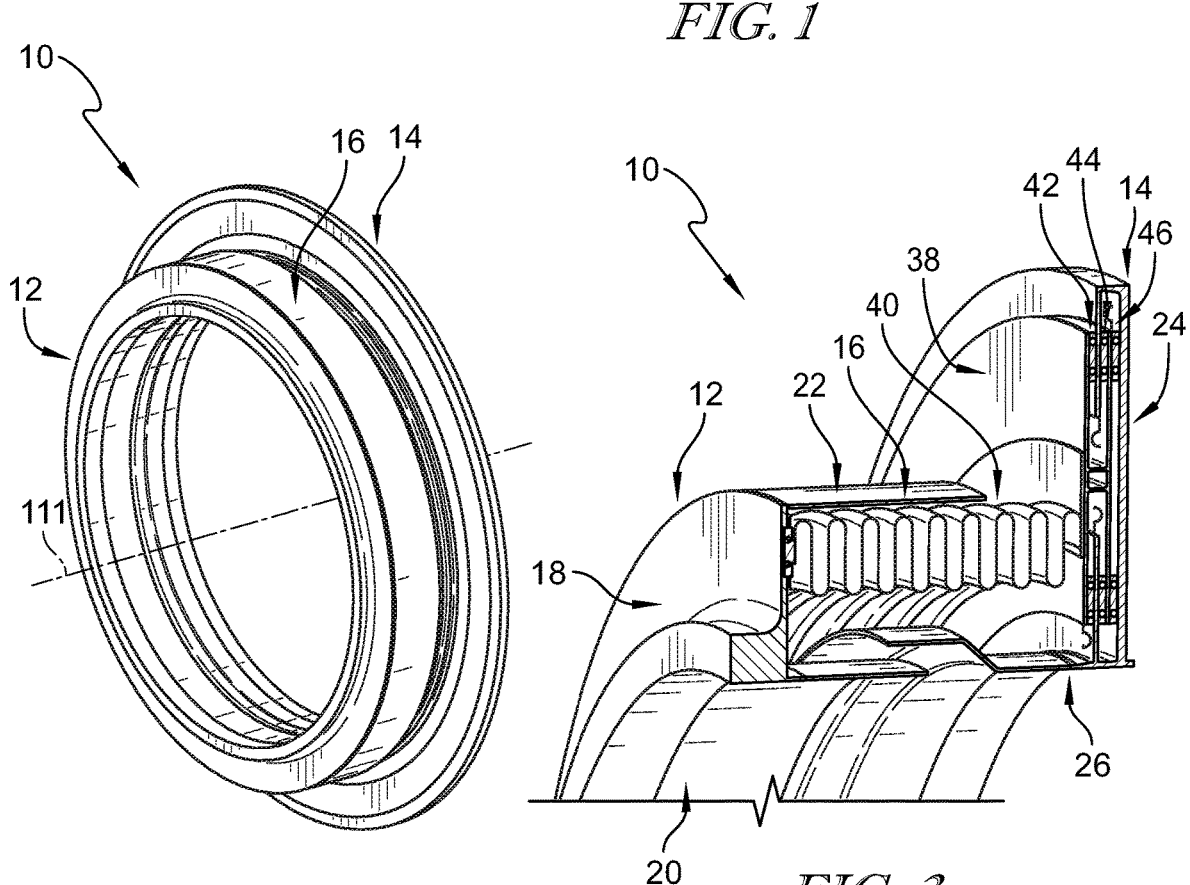
FIG. 2
FIG. 3

FLEXIBLE SEAL FOR GAS TURBINE ENGINE

FIELD OF THE DISCLOSURE

The present disclosure relates generally to gas turbine engines, and more specifically to exhaust systems for gas turbine engines.

BACKGROUND

Gas turbine engines are used to power aircraft, watercraft, power generators, and the like. Gas turbine engines may include exhaust systems that may have ducting to guide and redirect exhaust gases from an engine core of the gas turbine engine. In some circumstances, a flexible coupling may be connected with the exit of the engine core of the gas turbine engine with the ducting to allow for relative movement between the components.

Some flexible seals and couplings may result in an increase in leakage of hot exhaust gases through the coupling. Design of a flexible coupling with reduced leakage across the coupling present challenges.

SUMMARY

The present disclosure may comprise one or more of the following features and combinations thereof.

A coupling adapted for use with a gas turbine engine exhaust system may include a forward flange arranged circumferentially around an axis, an aft flange arranged circumferentially around the axis, and a seal assembly. The forward flange may be configured to be fixed to the gas turbine engine and to conduct exhaust gases from the gas turbine engine downstream. The aft flange may be configured to be fixed to ducting and to direct the exhaust gases from the forward flange into the ducting. The seal assembly may be configured to block the exhaust gases from passing radially between the forward flange and the aft flange while allowing for relative movement between the forward flange and the aft flange.

In some embodiments, the seal assembly may include a glide plate, a bellows seal, and a first bearing. The bellows seal may have a first end coupled with the forward flange and a second end bonded with the glide plate circumferentially entirely around the axis. The first bearing may be located between the glide plate and the aft flange to allow the aft flange to translate radially and rotate about the axis relative to the bellows seal and the glide plate in response to relative movement between the ducting and the gas turbine engine.

In some embodiments, the aft flange may be formed to define a radially inwardly opening channel and a radially outwardly opening channel. In some embodiments, at least a portion of the glide plate may be located in the radially inwardly opening channel and the radially outwardly opening channel.

In some embodiments, the glide plate may include a first disk, a second disk, and an annular band. The second disk may be spaced apart axially from the first disk. The annular band may extend axially between and interconnect the first disk and the second disk. In some embodiments, the second disk may be located in the radially inwardly opening channel and the radially outwardly opening channel formed in the aft flange.

In some embodiments, the seal assembly may further include a seal. The seal may engage the aft flange and one of the first disk and the second disk to block gases from passing between the aft flange and the glide plate.

In some embodiments, the forward flange may include a lip and a band. The lip may extend radially outward. The band may extend axially aft from the lip.

In some embodiments, the aft flange may include a sleeve and a band. The sleeve may extend radially outward. The band may extend axially forward away from the sleeve.

In some embodiments, the bellows seal may be located radially outward of the band of the aft flange. In some embodiments, the band of the aft flange may overlap the band of the forward flange. In some embodiments, the band of the aft band may be spaced apart radially from the band of the forward flange such that the band of the aft flange does not contact the band of the forward flange.

In some embodiments, the seal assembly may further include a ring and a second bearing. The first end of the bellows seal may be bonded to the ring circumferentially entirely around the axis. The second bearing may be located between the forward flange and the ring to allow the forward flange to rotate about the axis relative to the bellows seal. In some embodiments, the first end of the bellows seal may be bonded to the forward flange circumferentially entirely around the axis.

In some embodiments, the glide plate may include a first disk, a second disk, and an annular band. The second disk may be spaced apart axially from the first disk. The annular band may extend axially between and interconnect the first disk and the second disk. The annular band may be spaced apart from radial edges of the first disk and the second disk.

According to another aspect of the present disclosure, a coupling adapted for use with a gas turbine engine exhaust system may include a first flange, a second flange, and a seal assembly. The first flange may be arranged circumferentially around an axis. The second flange may be arranged circumferentially around the axis and formed to define a circumferentially extending channel.

In some embodiments, the seal assembly may include a plate and a seal. The plate may be located in the channel. The seal may be coupled with the first flange and with the plate. In some embodiments, the second flange may be configured to translate radially and rotate circumferentially about the axis relative to the plate.

In some embodiments, the seal assembly may include a bearing. The bearing may be located between the plate and the second flange to allow the second flange to translate radially and rotate about the axis relative to the seal and the plate.

In some embodiments, the plate may include a first disk, a second disk, and a band. The second disk may be spaced apart axially from the first disk. The band may extend axially between and interconnect the first disk and the second disk. In some embodiments, the band may be spaced apart from radial edges of the first disk and the second disk.

In some embodiments, the second flange may include a band and a sleeve. The sleeve may extend radially outward from the band.

In some embodiments, the sleeve may include a first wall and a second wall. The first wall may extend radially outward from the band. The second wall may be spaced apart axially from the first wall to define the channel between the first wall and the second wall. In some embodiments, the second wall may extend radially outward from the band.

In some embodiments, the sleeve may include a third wall. The third wall may extend axially away from the first wall and radially inward toward the axis to define another channel between the first wall and the third wall.

In some embodiments, the seal assembly may further include a ring and a first bearing. The seal may be bonded to the ring circumferentially entirely around the axis. The first bearing may be located between the first flange and the ring to allow the first flange to rotate about the axis relative to the seal.

In some embodiments, the seal assembly may further include a second bearing. The seal may be bonded to the plate circumferentially entirely around the axis. The second bearing may be located between the second flange and the plate.

In some embodiments, the first flange may include a lip and a band. The lip may extend radially outward. The band may extend axially from the lip.

In some embodiments, the second flange may include a sleeve and a band. The sleeve may extend radially outward. The band may extend axially away from the sleeve. In some embodiments, the seal may be located radially outward of the band of the second flange, and the band of the second flange may overlap the band of the first flange without contacting the band of the first flange.

According to another aspect of the present disclosure, a method may include several steps. The method may include providing a gas turbine engine, ducting, a first flange, a second flange, and a seal assembly that includes a plate and a seal, coupling the seal with the first flange, bonding the seal with the plate, locating the plate adjacent to or within the second flange to provide a coupling that comprises the first flange, the second flange, and the seal assembly, fixing the coupling to the gas turbine engine and to the ducting, and rotating the second flange about an axis relative to the seal without causing the seal to rotate about the axis.

In some embodiments, the second flange may include a band and a sleeve. The sleeve may extend radially outward from the band and define a circumferentially extending channel.

In some embodiments, at least a portion of the plate may be located in the channel. In some embodiments, the seal assembly may further include a bearing located between the plate and the second flange.

These and other features of the present disclosure will become more apparent from the following description of the illustrative embodiments.

BRIEF DESCRIPTION OF THE DRAWINGS

FIG. 1 is a cutaway view of a gas turbine engine that includes an engine core and an exhaust system coupled to the engine core having a ducting adapted to conduct various flow streams passed downstream of the engine core and a coupling configured to flexibly couple the ducting to the engine core;

FIG. 2 is a perspective view the coupling included in the exhaust system of the gas turbine engine of FIG. 1 showing the coupling is arranged circumferentially around an axis and includes a forward flange configured to be coupled with the gas turbine engine, an aft flange configured to couple with the ducting of the gas turbine engine, and a seal assembly configured to block the exhaust gases from passing radially between the forward flange and the aft flange while allowing for relative movement between the forward flange and the aft flange;

FIG. 3 is a perspective section view of a portion of the coupling of FIG. 2 showing the seal assembly includes a glide plate, a bellows seal extending between the forward flange and glide plate, and bearings located between the glide plate and the aft flange to allow the aft flange to translate radially and rotate about the axis relative to the bellows seal;

DETAILED DESCRIPTION OF THE DRAWINGS

Figure 4:
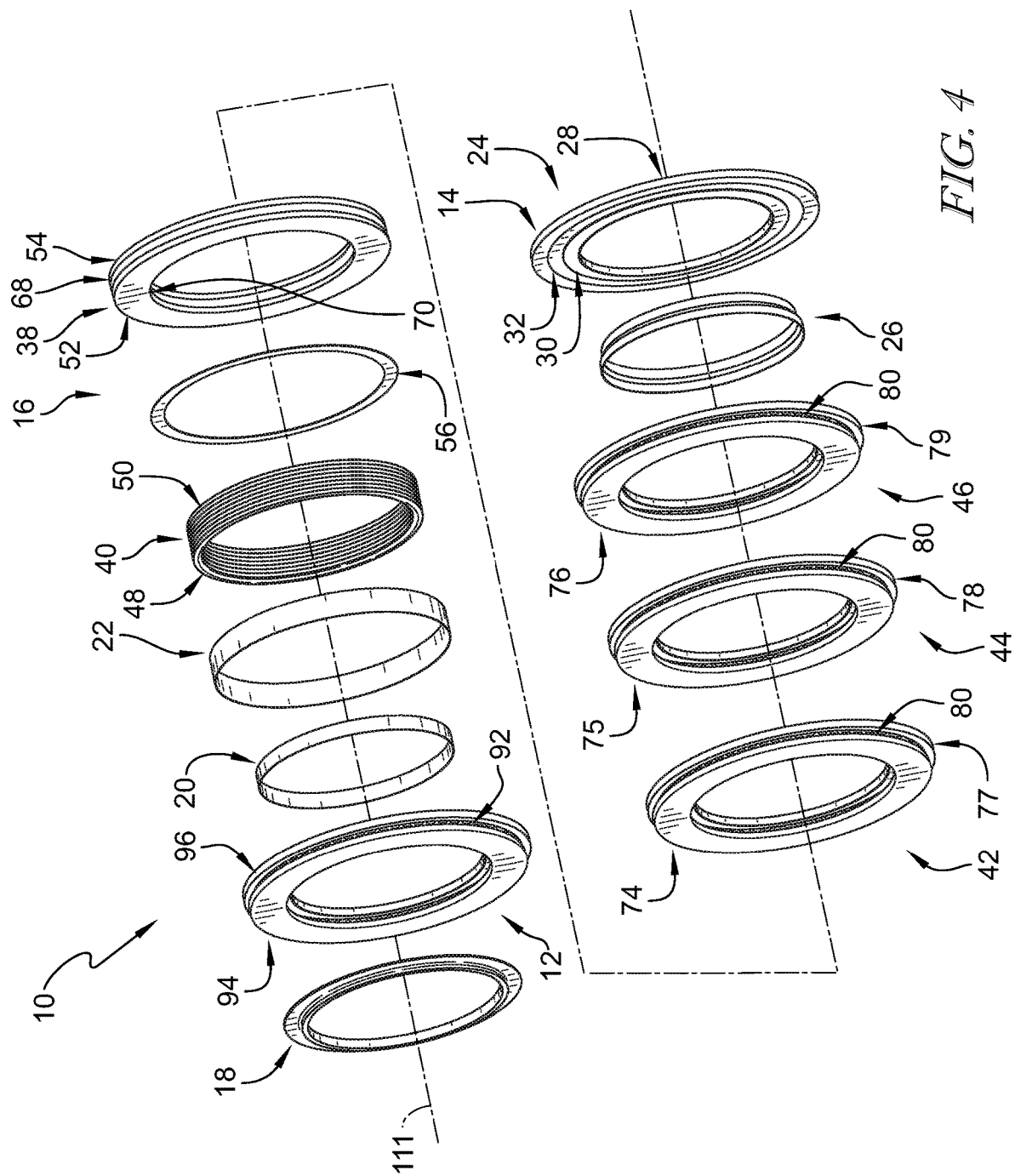
FIG. 4 is an exploded view of the coupling of FIG. 2 showing the forward flange, the aft flange, the bellows seal, and the plurality of bearings.

For the purposes of promoting an understanding of the principles of the disclosure, reference will now be made to a number of illustrative embodiments illustrated in the drawings and specific language will be used to describe the same.

A coupling 10 adapted for use with an exhaust system 114 of a gas turbine engine 110 is shown in FIGS. 1-3. The gas turbine engine 110 includes an engine core 112 and the exhaust system 114 as shown in FIG. 1. The engine core 112 is configured to conduct a flow of hot gases through the gas turbine engine 110 along a central axis 111. The exhaust system 114 is coupled to the engine core 112 and configured to direct exhausted hot gases from the engine core 112.

The exhaust system 114 includes ducting 116 as shown in FIGS. 1-3. The ducting 116 is configured to redirect the hot exhaust gases from the engine core 112, however the ducting 116 may not be rigidly coupled to an exit 118 of the engine core 112 of the gas turbine engine 110. As such, the ducting 116 may move relative to the gas turbine engine. For example, the ducting 116 may translate, rotate about the axis 111, or pivot perpendicular to the axis 111 in one of a number of directions. The coupling 10 is configured to flexibly couple the ducting 116 to the exit 118 of the engine core 112 of the gas turbine engine 110 and allow the ducting 116 to move relative to the engine core 112 while blocking gases from escaping between the ducting 116 and the engine core 112.

The coupling 10 includes a forward flange 12, an aft flange 14, and a seal assembly 16 as shown in FIGS. 2-5. The forward and aft flanges 12, 14 are each arranged circumferentially around the axis 111. The forward flange 12 is fixed to the engine core 112 of the gas turbine engine 110 and conducts exhaust gases from the gas turbine engine 110 in a downstream direction. The aft flange 14 is fixed with the ducting 116 and directs the exhaust gases from the forward flange 12 into the ducting 116. The seal assembly 16 blocks the exhaust gases from passing radially between the forward flange 12 and the aft flange 14 while allowing for relative movement between the forward flange 12 and the aft flange 14.

In this way, the coupling 10 may pass a large volume of very hot gases at a high rate between two separate components, while allowing the components to move independently of one another. The coupling 10 may allow the coupled components to move independently of each other in all six degrees of freedom, with little to no leakage of the hot gases. Further, the minimized loading on the coupling 10 may allow the coupling 10 to have a long service life.

Figure 5:
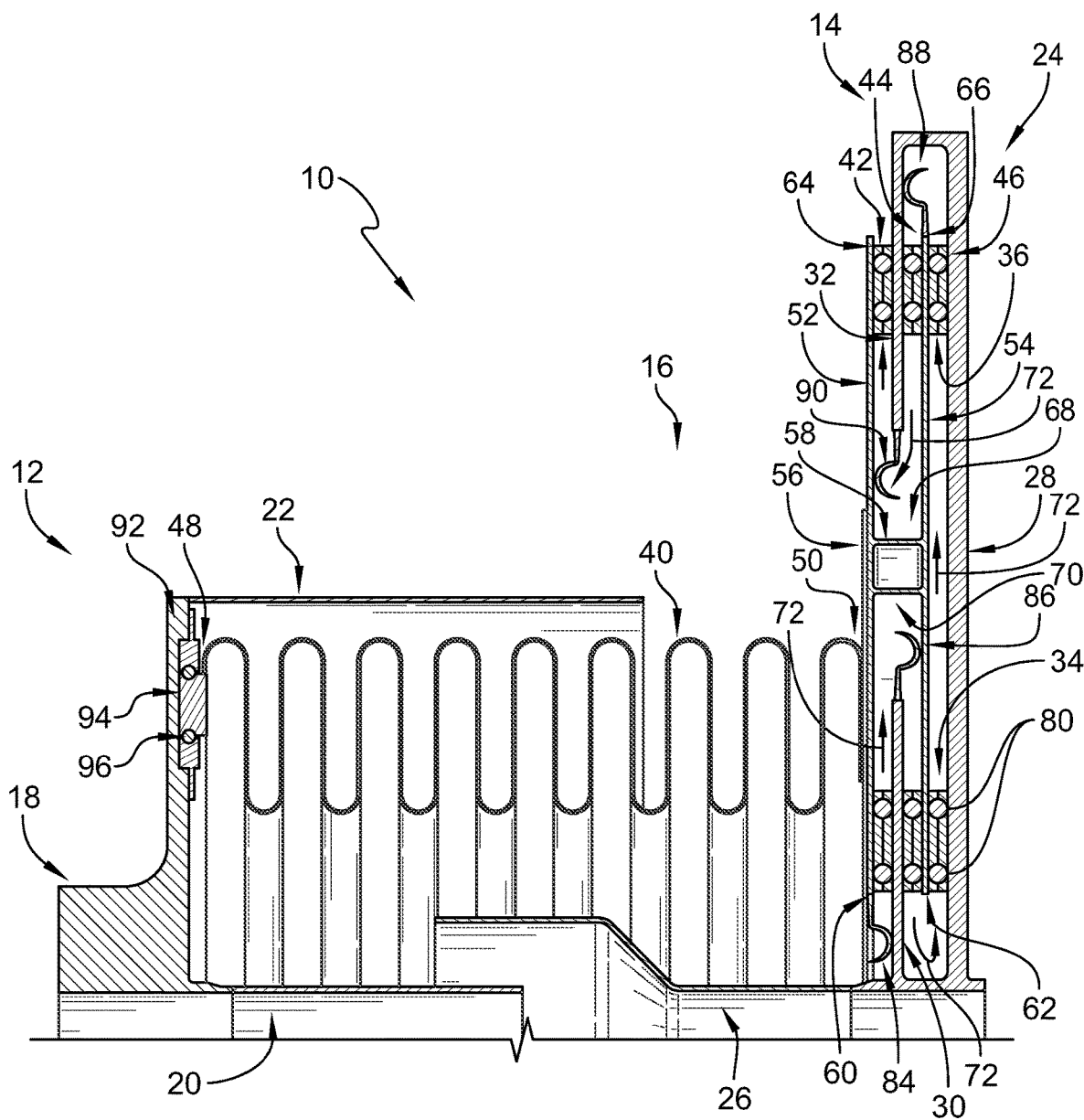
FIG. 5 is section view of the coupling of FIG. 2 showing the bellows seal extending between the forward flange and the aft flange and further showing the seal assembly includes a plurality of seals coupled to one of the glide plate and the aft flange that engage the other one of the glide plate and the aft flange to block gases from passing between the aft flange and the glide plate.

The forward flange 12 includes a lip 18, an inner band 20, and an outer band 22 as shown in FIGS. 3-5. The lip 18 extends radially outward. The inner band 20 and outer band 22 each extend axially aft from the lip 18. The outer band 22 is spaced radially outward from the inner band 20 to locate a portion of the seal assembly 16 therebetween.

The aft flange 14 includes a sleeve 24 and a band 26 as shown in FIGS. 3-5. The sleeve 24 extends radially outward. The band 26 extends axially forward away from the sleeve 24 and overlaps the band 20 of the forward flange 12. In the illustrative embodiment, the band 26 of the aft band 14 is spaced apart radially from the band 20 of the forward flange 12 such that the band 26 of the aft flange 14 does not contact the band 20 of the forward flange 12.

The sleeve 24 includes a first wall 28, a second wall 30, and a third wall 32 as shown in FIGS. 3-5. The first wall 28 extends radially outward from the band 26 of the aft flange 14. The second wall 30 is spaced apart axially from the first wall 28 and extends radially outward from the band 26 away from the axis 111 to define radially outwardly opening channel 34 between the first wall 28 and the second wall 30. The third wall 32 extends axially away from the first wall 28 and radially inward toward the axis 111 to define a radially inwardly opening channel 36 between the first wall 28 and the third wall 32.

The seal assembly 16 includes a glide plate 38, a bellows seal 40, and a plurality of bearings 42, 44, 46 as shown in FIGS. 3-5. The bellows seal 40 is located radially outward of the band 26 of the aft flange 14 and is arranged to extend between the forward flange 12 and the glide plate 38. The bellows seal 40 has a first end 48 coupled with the forward flange 12 and a second end 50 coupled with the glide plate 38 circumferentially entirely around the axis 111. Illustratively, the bellows seal 40 is bonded with the glide plate 38. Each of the bearings 42, 44, 46 is located between the glide plate 38 and the aft flange 14 to allow the aft flange 14 to translate radially and rotate about the axis 111 relative to the bellows seal 40 and the glide plate 38 in response to relative movement between the ducting 116 and the gas turbine engine 110.

The glide plate 38 includes a first disk 52, a second disk 54, a ring 56, and an annular band 58 as shown in FIGS. 3-5. The second disk 54 is spaced apart axially from the first disk 52. The annular band 58 extends axially between and interconnects the first disk 52 and the second disk 54. The ring 56 is coupled to the first disk 52 so that the ring 56 extends between and interconnects the bellows seal 40 with the first disk 52, second disk 54, and annular band 58.

In the illustrative embodiment, the first disk 52, the second disk 54, and the annular band 58 are integrally formed such that the first disk 52, the second disk 54, and the annular band 58 form a single-piece component. The ring 56 is bonded to the first disk 52 in the illustrative embodiment. In other embodiments, the ring 56 may integral with the first disk 52, the second disk 54, and the annular band 56.

In some embodiments, the first disk 52, the second disk 54, the ring 56, and the annular band 58 may be separate components that are bonded to together to form the glide plate 38. In other embodiments, any combination of the first disk 52, the second disk, 56, the ring 56, and the annular band 58 may be separate or integral components.

In the illustrative embodiment, the second end 50 of the bellows seal 40 is bonded to the ring 56 of the glide plate 38 as shown in FIGS. 3-5 to block gases from flowing between the bellows seal 40 and the ring 56. In other embodiments, the ring 56 is omitted and the second end 50 of the bellows seal 40 is directly bonded to the first disk 52 of the glide plate 38. In other embodiments, the ring 56 may be integral with the first disk 52 to from a raised edge on the glide plate 38 and the second end 50 of the bellows seal 40 may be bonded to the ring 56.

In the illustrative embodiment, the annular band 58 is spaced apart from radial inner and outer edges 60, 62, 64, 66 of the first disk 52 and the second disk 54. The annular band 58 extends between the first disk 52 and the second disk 54 to define an outer channel 68 that opens radially outward away from the axis 111 and an inner channel 70 that opens radially inward toward the axis 111.

In the illustrative embodiment, the second disk 54 is located in the radially inwardly opening channel 36 and the radially outwardly opening channel 34 formed in the aft flange 14 such that the third wall 32 of the sleeve 24 is located in the outer channel 68 and the second wall 30 of the sleeve 24 is located in the inner channel 70. The arrangement of the glide plate 38 in the radially outwardly and inwardly opening channels 34, 36 and the aft flange 14 in the outer and inner channels 68, 70 forms a torturous path 72 for the hot exhaust gases. The torturous path 72 indicated by arrows 72 minimizes the leakage radially across the coupling 10.

The plurality of bearings 42, 44, 46 includes a first bearing 42, a second bearing 44, and a third bearing 46 as shown in FIGS. 3-5. The first bearing 42 is located axially between the first disk 52 of the glide plate 38 and the second and third walls 30, 32 of the sleeve 24. The second bearing 44 is located axially between the second and third walls 30, 32 of the sleeve 24 and the second disk 54 of the glide plate 38. The third bearing 46 is located axially between the second disk 54 of the glide plate 38 and the first wall 28 of the sleeve 24.

In other embodiments, the seal assembly 16 only includes a single bearing 42 between the glide plate 38 and the sleeve 24 of the aft flange 14. In some embodiments, the seal assembly 16 may include at least two bearings 42, 44, 46 between the glide plate 38 and the sleeve 24 of the aft flange 14. In other embodiments, the seal assembly 16 may include more than three bearings 42, 44, 46. In other embodiments, the bearings 42, 44, 46 are omitted.

In the illustrative embodiments, each of the bearings 42, 44, 46 includes a forward plate 74, 75, 76, an aft plate 77, 78, 79, a cage 80, and a plurality of rolling elements 82 as shown in FIGS. 3-5. The forward plate 74 of the first bearing 42 is coupled to the first disk 52 of the glide plate 38, while the aft plate 77 of the first bearing 42 is coupled to the second and third walls 30, 32 of the sleeve 24. The forward plate 75 of the second bearing 44 is coupled to the second and third walls 30, 32 of the sleeve 24, while the aft plate 78 of the second bearing 44 is coupled to second disk 54 of the glide plate 38. The forward plate 76 of the third bearing 46 is coupled to the second disk 54 of the glide plate 38, while the aft plate 79 of the third bearing 46 is coupled to the first wall 28 of the sleeve 24. Each of the cages 80 is configured to hold the plurality of rolling elements 82 in placed relative to the forward and aft plates 74, 75, 76, 77, 78, 79, so that the forward plate 74, 75, 76 and the aft plate 77, 78, 79 may rotate about the axis 111 relative to one another.

In other embodiments, the first disk 52, the second disk 54, the first wall 28, the second wall 30, and the third wall 32 are configured to be one of the forward plate 74, 75, 76 and the aft plate 77, 78, 79 for the corresponding bearing 42, 44, 46. For example, the first disk 52 may be configured to act as the forward plate 74 for the first bearing 42, and the second and third walls 30, 32 of the sleeve 24 may be configured to act as the aft plate 77 for the first bearing 42.

In the illustrative embodiments, the seal assembly 16 further includes a plurality of seals 84, 86, 88, 90 as shown in FIGS. 3 and 5. The seals 84, 86, 88, 90 engage the aft flange 14 and one of the first disk 52 and the second disk 54 to block gases from passing between the aft flange 14 and the glide plate 38.

In the illustrative embodiments, the plurality of seals 84, 86, 88, 90 includes a first seal 84, a second seal 86, a third seal 88, and a fourth seal 90 as shown in FIGS. 3 and 5. The first seal 84 is coupled to the inner radial edge 60 of the first disk 52 and engages the second wall 30 of the sleeve 24 to block gases from passing between the first disk 52 and the second wall 30. The second seal 86 is coupled to the outer radial edge 62 of the first disk 52 and engages the third wall 32 of the sleeve 24 to block gases from passing between the first disk 52 and the third wall 32. The third seal 88 is coupled to an inner edge 61 of the second wall 30 and engages the second disk 54 to block gases from passing between the second wall 30 and the second disk 54. The fourth seal 90 is coupled to an inner edge 63 of the third wall 32 and engages the second disk 54 of the glide plate 38 to block gases from passing between the third wall 32 and the second disk 54.

In the illustrative embodiment, the second, third, and fourth seals 86, 88, 90 may be redundant and may be omitted from the seal assembly 16. In other embodiments, the seal assembly 16 includes a single seal 84 coupled to the inner radial edge 60 of the first disk 54. The single seal 84 engages the second wall 30 to block gases from passing between the glide plate 38 and the sleeve 24.

In the illustrative embodiment, the seal assembly 16 further includes a forward attachment assembly 92 as shown in FIGS. 3-5. The forward attachment assembly 92 is arranged to extend between and interconnect the first end 48 of the bellows seal 40 and the lip 18 of the forward flange 12.

The forward attachment assembly 92 includes a ring 94 and a fourth bearing 96 as shown in FIGS. 3-5. The first end 48 of the bellows seal 40 is bonded to the ring 94 circumferentially entirely around the axis 111. The fourth bearing 96 is located between the forward flange 12 and the ring 94 to allow the forward flange 12 to rotate about the axis 111 relative to the bellows seal 40. In other embodiments, the first end 48 of the bellows seal 40 is directly bonded to the lip 18 of the forward flange 12 circumferentially entirely around the axis 111.

A method for assembling the coupling 10 and using the coupling 10 in the gas turbine engine 110 may include several steps. The method includes coupling the bellows seal 40 with the forward flange 12, bonding the bellows seal 40 to the glide plate 38, and locating the glide plate 38 adjacent to or within the sleeve 24 of the aft flange 14 to provide the coupling 10 that comprises the forward flange 12, the aft flange 14, and the seal assembly 16.

The method further includes fixing the coupling 10 to the gas turbine engine 110 and to the ducting 116. The fixing step includes bonding the forward flange 12 to the gas turbine engine 110 and bonding the aft flange 14 to the ducting 116. The method further includes rotating the aft flange 14 about the axis 111 relative to the bellows seal 40 without causing the bellows seal 40 to rotate about the axis 111.

Figure 6:
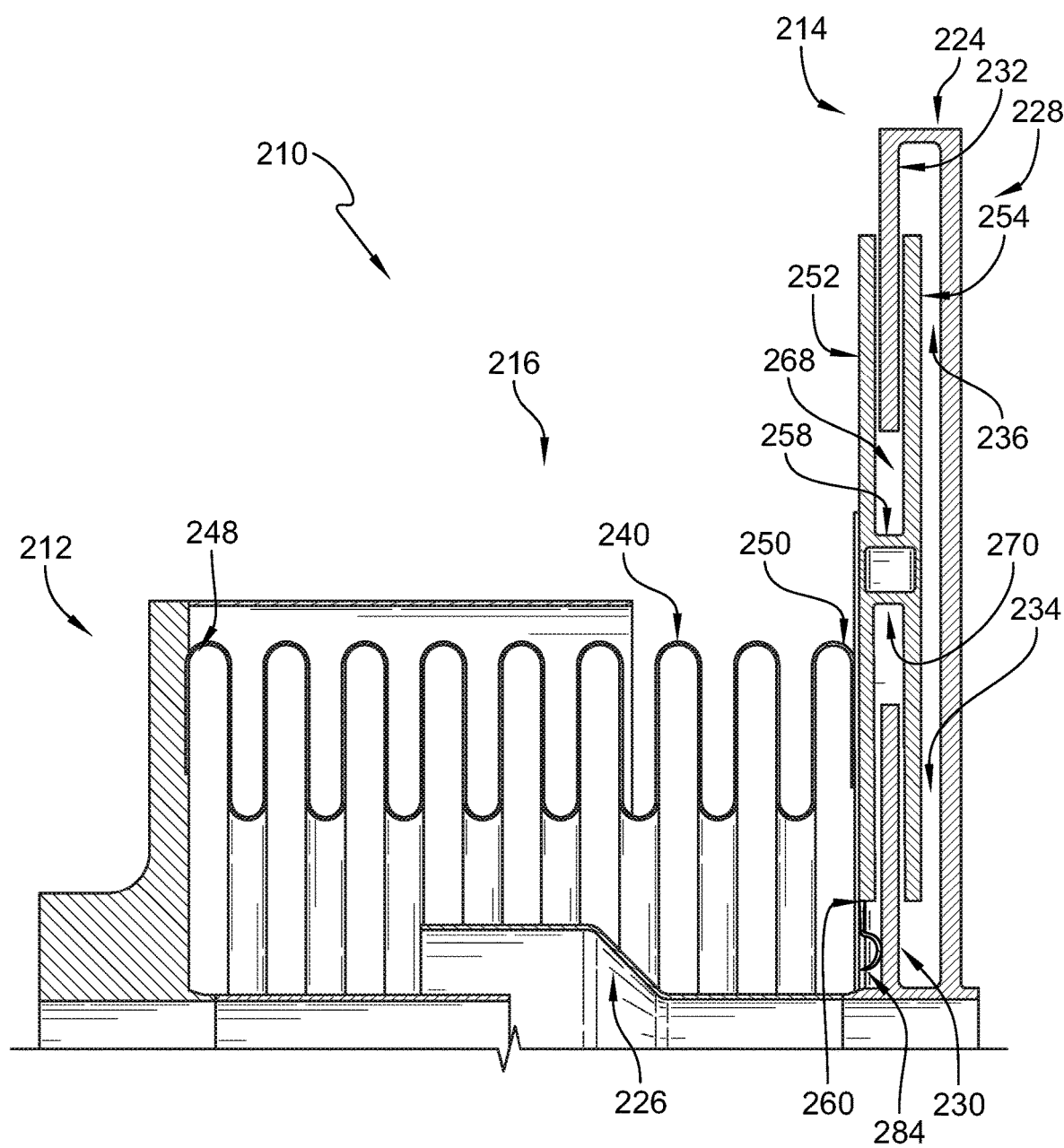
FIG. 6 is a section view of another embodiment of a coupling adapted for use in the gas turbine engine of FIG. 1 showing the coupling includes a forward flange, an aft flange, and a seal assembly configured to block the exhaust gases from passing radially between the forward flange and the aft flange while allowing for relative movement between the forward flange and the aft flange, and further showing the seal assembly includes a glide plate and a bellows seal.

Another embodiment of a coupling 210 in accordance with the present disclosure is shown in FIG. 6. The coupling 210 is substantially similar to the coupling 10 shown in FIGS. 1-7 and described herein. Accordingly, similar reference numbers in the 200 series indicate features that are common between the coupling 10 and the coupling 210. The description of the coupling 10 is incorporated by reference to apply to the coupling 210, except in instances when it conflicts with the specific description and the drawings of the coupling 210. The coupling 210 does not include bearings for the forward and aft flanges.

The coupling 210 includes a forward flange 212, an aft flange 214, and a seal assembly 216 as shown in FIG. 6. The forward and aft flanges 212, 214 are each arranged circumferentially around the axis 111. The seal assembly 216 is configured to block the exhaust gases from passing radially between the forward flange 212 and the aft flange 214 while allowing for relative movement between the forward flange 212 and the aft flange 214.

The aft flange 214 includes a sleeve 224 having a first wall 228, a second wall 230, and a third wall 232 as shown in FIG. 6. The first wall 228 extends radially outward from the band 226 of the aft flange 214. The second wall 230 is spaced apart axially from the first wall 228 and extends radially outward from the band 226 away from the axis 111 to define radially outwardly opening channel 234 between the first wall 228 and the second wall 230. The third wall 232 extends axially away from the first wall 228 and radially inward toward the axis 111 to define a radially inwardly opening channel 236 between the first wall 228 and the third wall 232.

The seal assembly 216 includes a glide plate 238 and a bellows seal 240 as shown in FIG. 6. The bellows seal 240 is arranged to extend between the forward flange 212 and the glide plate 238. The bellows seal 240 has a first end 248 coupled with the forward flange 212 and a second end 250 bonded with the glide plate 238 circumferentially entirely around the axis 111.

The glide plate 238 includes a first disk 252, a second disk 254, and an annular band 258 as shown in FIG. 6. The second disk 254 is spaced apart axially from the first disk 252. The annular band 258 extends axially between and interconnects the first disk 252 and the second disk 254. In the illustrative embodiment, the annular band 258 extends between the first disk 252 and the second disk 254 to define an outer channel 268 that opens radially outward away from the axis 111 and an inner channel 270 that opens radially inward toward the axis 111.

In the illustrative embodiment, the second disk 254 is located in the radially inwardly opening channel 236 and the radially outwardly opening channel 234 formed in the aft flange 214 such that the third wall 232 of the sleeve 224 is located in the outer channel 288 and the second wall 230 of the sleeve 224 is located in the inner channel 270. Each of the channels 234, 236, 288, 270 is sized to allow for a clearance gap between the glide plate 238 and the sleeve 224 in each of the respective channels.

In the illustrative embodiment, the clearance gaps between the glide plate 238 and the sleeve 224 are configured to allow the aft flange 214 to translate radially and rotate about the axis 111 relative to the glide plate 238. In some embodiments, a coating may be applied to one of or all of the surfaces of the first wall 228, the second wall 230, the third wall 232, the first disk 252, and the second disk 254. The coating may be configured to increase sliding and rotation of the aft flange 214 relative to the glide plate 238.

In the illustrative embodiments, the seal assembly 216 further includes a seal 284 as shown in FIGS. 3 and 5. The seal 284 engages the aft flange 214 to block gases from passing between the aft flange 214 and the glide plate 238.

In the illustrative embodiments, the seal 284 is coupled to an inner radial edge 260 of the first disk 252 and engages the second wall 230 of the sleeve 224 to block gases from passing between the first disk 252 and the second wall 230.

The present disclosure relates to a low leakage, high temperature flexible coupling 10 for attaching a ducting 116 to an engine core 112 in a gas turbine engine 110. In some embodiments, during gas turbine engine operation, hot exhaust gases are allowed to freely exit into the atmosphere. In other embodiments, the hot exhaust gases from the engine core 112 may be directed into the ducting 116 or another component that may not be rigidly mounted to the exit 118 of the gas turbine engine 110.

In this case, the flexible coupling of the present disclosure may be configured to connect the two components. In other embodiments, such as rocket motors and high temperature steam generators (e.g. nuclear), such a flexible, low leakage coupling 10 may also be desirable. In contrast, other flexible couplings may allow leakage of the hot gases past the coupling.

In some embodiments, the movement of the ducting 116 relative to the engine 110 may cause the flexible coupling 10 to expand and compress. In some embodiments, the ends of the flexible seal or bellows seal may be welded to both forward and aft components of the coupling. In this way, hot exhaust gases leaking past the ends of the flexible seal may be reduced.

A seal welded directly to the coupled components may produce a high torsional stiffness in the seal. The high torsional stiffness may causes the stresses in the seal to exceed the allowable stresses with even a small rotation about an axis. The present disclosure provides a flexible coupling 10 that is not over constrained and is configured to be displaced, rotated normal to the axis 111 of the engine 110, and rotated about the engine centerline axis 111 without exceeding the allowable stresses. By releasing some of the degrees of freedom, the stresses in the seal 40 may be minimized.

In the illustrative embodiments, the flexible coupling 10 includes the glide plate 38, the bellows seal 40, and the plurality of bearings 42, 44, 46, 96 that allow the glide plate 38 to rotate and mover radially relative to the engine centerline 111. The glide plate 38 in turn allows the bellows seal 40 to be welded or bonded at both ends 48, 50, minimizing the leakage radially across the seal 40.

While welding the ends 48, 50 of the seal 40 to the forward and aft flanges 12, 14 may reduce leakage around the seal 40, there may be gas between the gaps of the glide plate 38 and aft flange 14, as shown by the arrows 72. The leakages across these gaps is reduced or manageable because the gaps may be of a fixed distance (i.e. approximately a ball bearing diameter apart) and the surfaces on other side of the gap remain parallel. In the illustrative embodiments, the coupling 10 includes a plurality of seals 84, 86, 88, 90 to reduce the leakage across the gaps between the glide plate 38 and the sleeve 24 of the aft flange 14. Only one seal 84 may be used at the inner radial edge 60 of the first disk 52, but multiple seals may be used. The other seals 86, 88, 90 may offer additional insurance in case the first seal 84 failed. The additional seals 86, 88, 90 may also help to decrease the overall leakage rate.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A coupling adapted for use with a gas turbine engine exhaust system, the coupling comprising
a forward flange arranged circumferentially around an axis of the gas turbine engine exhaust system,
the forward flange configured to be fixed to the gas turbine engine and to conduct exhaust gases from the gas turbine engine downstream,
an aft flange arranged circumferentially around the axis downstream from the forward flange,
the aft flange configured to be fixed to ducting downstream of the aft flange and to direct the exhaust the gases from the forward flange into the ducting, and
a seal assembly configured to block the exhaust gases from passing radially outward from between the forward flange and the aft flange while allowing for relative movement of the forward flange with respect to the aft flange,
the seal assembly including
a glide plate arranged circumferentially around the axis,
a bellows seal having a first end coupled with the forward flange and a second end bonded with the glide plate circumferentially entirely around the axis, and
a first bearing located between the glide plate and the aft flange to allow the aft flange to translate radially and rotate about the axis relative to the bellows seal and the glide plate in response to relative movement between the ducting and the gas turbine engine.

2. The coupling of claim 1, wherein the aft flange is formed to define a radially inwardly opening channel and a radially outwardly opening channel and a portion of the glide plate is located in the radially inwardly opening channel and the radially outwardly opening channel.

3. The coupling of claim 2, wherein the glide plate includes a first disk, a second disk spaced apart axially from the first disk, and an annular band that extends axially between and interconnects the first disk and the second disk and wherein the second disk is the portion of the glide plate located in the radially inwardly opening channel and the radially outwardly opening channel formed in the aft flange.

4. The coupling of claim 3, wherein the seal assembly further includes a seal that engages the alt flange and one of the first disk or the second disk to block the exhaust gases from passing between the aft flange and the glide plate.

5. The coupling of claim 4, wherein the forward flange includes a lip that extends radially outward and a band that extends axially aft from the lip, the aft flange includes a sleeve that extends radially outward and a band that extends axially forward away from the sleeve, the bellows seal is located radially outward of the band of the aft flange, and the band of the aft flange overlaps the band of the forward flange.

6. The coupling of claim 5, wherein the band of the aft flange is spaced apart radially from the band of the forward flange such that the band of the aft flange does not contact the band of the forward flange.

7. The coupling of claim 5, wherein the seal assembly further includes a ring and a second bearing, the first end of the bellows seal is bonded to the ring circumferentially entirely around the axis, and the second bearing is located between the forward flange and the ring to allow the forward flange to rotate about the axis relative to the bellows seal.

8. The coupling of claim 1, wherein the first end of the bellows seal is bonded to the forward flange circumferentially entirely around the axis.

9. The coupling of claim 1, wherein the glide plate includes a first disk, a second disk spaced apart axially from the first disk, and an annular band that extends axially between and interconnects the first disk and the second disk, wherein the annular band is radially spaced apart from the outer circumferential edge of the first disk and the outer circumferential edge of the second disk.

10. A coupling adapted for use with a gas turbine engine exhaust system, the coupling comprising
a first flange arranged circumferentially around an axis of the gas turbine engine exhaust system,
a second flange, arranged circumferentially around the axis and formed to define a circumferentially extending channel,
a seal assembly that includes a plate arranged circumferentially around the axis and located in the channel and a seal arranged circumferentially around the axis and coupled with the first flange and with the plate, and
a first bearing located between the plate and the second flange,
wherein the second flange is configured to translate radially and rotate circumferentially about the axis relative to the plate.

11. The coupling of claim 10, wherein the first bearing located between the plate and the second flange allows the second flange to translate radially and rotate about the axis relative to the seal and the plate.

12. The coupling of claim 10, wherein the plate includes a first disk, a second disk spaced apart axially from the first disk, and a band that extends axially between and interconnects the first disk and the second disk wherein the band is radially spaced apart from the outer circumferential edge of the first disk and the outer circumferential edge of the second disk.

13. The coupling of claim 10, wherein the second flange includes a band and a sleeve that extends radially outward from the band, the sleeve includes a first wall that extends radially outward from the band and a second wall spaced apart axially from the first wall to define the channel between the first wall and the second wall.

14. The coupling of claim 13. wherein the second wall extends radially outward from the band.

15. The coupling of claim 14, wherein the sleeve includes a third wall that extends axially away from the first wall and radially inward toward the axis to define another channel between the first wall and the third wall.

16. The coupling of claim 10, wherein the seal assembly further includes a ring and a second bearing, the seal is bonded to the ring circumferentially entirely around the axis, and the second bearing is located between the first flange and the ring to allow the first flange to rotate about the axis relative to the seal.

17. The coupling of claim 16, wherein the seal is bonded to the plate circumferentially entirely around the axis.

18. The coupling of claim 10, wherein the first flange includes a lip that extends radially outward and a band that extends axially from the lip, the second flange includes a sleeve that extends radially outward and a band that extends axially away from the sleeve, the seal is located radially outward of the band of the second flange, and the band of the second flange overlaps the band of the first flange without contacting the band of the first flange.

19. A method comprising
providing a gas turbine engine, ducting, a first flange arran ed circumferentially about an axis of the gas turbine engine, a second flange arranged circumferentially about the axis, and a seal assembly that includes a plate aranged circumferentially about the axis, a bearing, and a seal,
coupling the seal with the first flange,
bonding the seal with the plate circumferentially entirel about the axis,
locating a portion of the plate within a circumferentially extendin channel of the second flange and locating the bearing between the plate and the second flange to provide a coupling that comprises the first flange, the second flange, and the seal assembly,
fixing the coupling to the gas turbine engine and to the ducting, and
rotating the second flange about the axis relative to the seal and the plate, and translating the second flange radially relative to the seal and the plate without causing the seal to rotate about the axis.

20. The method of claim 19, wherein the second flange includes a band and a sleeve that extends radially outward trom the band to define a circumferentially extending channel.

* * * * *